(12) United States Patent
Fattal

(10) Patent No.: US 11,635,619 B2
(45) Date of Patent: Apr. 25, 2023

(54) BACKLIT TRANSPARENT DISPLAY, TRANSPARENT DISPLAY SYSTEM, AND METHOD

(71) Applicant: LEIA INC., Menlo Park, CA (US)

(72) Inventor: David A. Fattal, Menlo Park, CA (US)

(73) Assignee: LEIA INC., Menlo Park, CA (US)

( * ) Notice: Subject to any disclaimer, the term of this patent is extended or adjusted under 35 U.S.C. 154(b) by 0 days.

(21) Appl. No.: 17/734,951

(22) Filed: May 2, 2022

(65) Prior Publication Data

US 2022/0260833 A1    Aug. 18, 2022

Related U.S. Application Data

(63) Continuation of application No. 16/845,886, filed on Apr. 10, 2020, now Pat. No. 11,347,053, which is a continuation of application No. PCT/US2017/058854, filed on Oct. 27, 2017.

(51) Int. Cl.
*F21V 8/00* (2006.01)
*G02B 27/01* (2006.01)

(52) U.S. Cl.
CPC ....... *G02B 27/0101* (2013.01); *G02B 6/0038* (2013.01); *G02B 6/0063* (2013.01)

(58) Field of Classification Search
None
See application file for complete search history.

(56) References Cited

U.S. PATENT DOCUMENTS

| 8,941,631 B2 | 1/2015 | Khazeni et al. |
| 9,110,357 B2 | 8/2015 | Natsumeda et al. |
| 9,128,226 B2 | 9/2015 | Fattal et al. |

(Continued)

FOREIGN PATENT DOCUMENTS

| JP | 2004319252 A | 11/2004 |
| WO | 2012038856 A1 | 3/2012 |

(Continued)

OTHER PUBLICATIONS

International Search Report and Written Opinion (ISRWO) from the International Searching Authority (ISA/KR) dated Jul. 18, 2018 (14 pages) for counterpart parent PCT Application No. PCT/US2017/058854.

(Continued)

*Primary Examiner* — Sean P Gramling
(74) *Attorney, Agent, or Firm* — J. Michael Johnson

(57) ABSTRACT

A backlit transparent display and a transparent display system provide a displayed image while enabling a background scene to be visible through the display. The backlit transparent display includes a light guide, a plurality of scattering elements, and an array of light valves configured to modulate emitted light scattered from the light guide to provide modulated emitted light representing a displayed image. Transparency of the backlit transparent display is configured to enable the background scene to be visible through the backlit transparent display. The transparent display system includes the array of light valves and a transparent backlight. The transparent display system is configured to provide the displayed image as superimposed on the background scene visible through the transparent display system.

17 Claims, 9 Drawing Sheets

(56) References Cited

U.S. PATENT DOCUMENTS

| | | | |
|---|---|---|---|
| 9,201,270 | B2 | 12/2015 | Fattal et al. |
| 9,298,168 | B2 | 3/2016 | Taff et al. |
| 9,389,415 | B2 | 7/2016 | Fattal et al. |
| 9,459,461 | B2 | 10/2016 | Santori et al. |
| 9,557,466 | B2 | 1/2017 | Fattal |
| 9,785,119 | B2 | 10/2017 | Taff et al. |
| 10,345,505 | B2 | 7/2019 | Fattal |
| 10,798,371 | B2 | 10/2020 | Fattal |
| 2008/0101088 | A1 | 5/2008 | Kim et al. |
| 2011/0141395 | A1 | 6/2011 | Yashiro |
| 2012/0008067 | A1 | 1/2012 | Mun et al. |
| 2012/0127751 | A1 | 5/2012 | Kimmel |
| 2012/0195072 | A1 | 8/2012 | Minami |
| 2013/0106922 | A1 | 5/2013 | Chen et al. |
| 2015/0124480 | A1* | 5/2015 | Baker .................. G02B 5/0278 362/613 |
| 2015/0355403 | A1 | 12/2015 | Santori et al. |
| 2015/0362667 | A1 | 12/2015 | Dunn |
| 2016/0018582 | A1 | 1/2016 | Fiorentino et al. |
| 2016/0320620 | A1 | 11/2016 | Maimone |
| 2017/0090096 | A1 | 3/2017 | Fattal |
| 2017/0132962 | A1 | 5/2017 | Tang |
| 2017/0299794 | A1 | 10/2017 | Fattal |
| 2017/0363794 | A1 | 12/2017 | Wan et al. |
| 2018/0188691 | A1 | 7/2018 | Fattal |
| 2018/0196194 | A1 | 7/2018 | Fattal |
| 2018/0306965 | A1 | 10/2018 | Fattal |
| 2019/0025494 | A1 | 1/2019 | Fattal et al. |
| 2019/0155105 | A1 | 5/2019 | Aieta et al. |

FOREIGN PATENT DOCUMENTS

| | | | | |
|---|---|---|---|---|
| WO | WO-2014010585 | A1 * | 1/2014 | ............. G09F 13/04 |
| WO | 2016111707 | A1 | 7/2016 | |

OTHER PUBLICATIONS

Fattal, David et al., "A multi-directional backlight for a wide-angle, glasses-free three-dimensional display," Nature, Mar. 21, 2013, pp. 348-351, vol. 495, Macmillan Publishers Limited, 2013.

Chun-Wei Liu, et al., Sub-wavelength gratings fabricated on a light bar by roll-to-roll UV embossing process, Optics Express, Jun. 6, 2011, pp. 11299-11311, vol. 19, No. 12.

Travis et al., "Collimated light from a waveguide for a display backlight," OPTICS EXPRESS, Oct. 2009, pp. 19714-19719, vol. 17, No. 22.

Xu et al., "Computer-Generated Holography for Dynamic Display of 3D Objects with Full Parallax," International Journal of Virtual Reality, 2009, pp. 33-38, vol. 8, No. 2.

Son, Jung-Young et al., "Three-Dimensional Imaging Methods Based on Multiview Images," IEEE/OSA Journal of Display Technology, Sep. 2005, pp. 125-140, vol. 1, No. 1.

Kee, Edwin., "Hitachi Full Parallax 3D Display Offers Mind Bending Visuals," http://www.ubergizmo.com/2011/10/hitachi-full-parallax-3d-display-offers-mind-bending-visuals, Oct. 4, 2011, 2 pages.

Reichelt et al.,"Holographic 3-D Displays—Electro-holography within the Grasp of Commercialization," Advances in Lasers and Electro-Optics, Optics, Nelson Costa and Adolfo Cartaxo (Ed.), (2010), pp. 683-711, ISBN: 978-953-307-088-9, InTech, Available from: http://www.intechopen.com/books/advances-in-lasers-and-electro-optics/holographic-3-ddisplays-electro-holography-within-the-grasp-of-commercialization.

Maimone, A., et al., Pinlight Displays: Wide Field of View Augmented Reality Eyeglasses using Defocused Point Light Sources, ACM Transactions on Graphics, Jul. 2014, pp. 89.1-89.11, vol. 33, No. 4, Article 89.

* cited by examiner

BACKLIT TRANSPARENT DISPLAY, TRANSPARENT DISPLAY SYSTEM, AND METHOD

CROSS-REFERENCE TO RELATED APPLICATIONS

This application is a continuation patent application of and claims priority to U.S. application Ser. No. 16/845,886, filed Apr. 10, 2020, which claims priority to International Patent Application No. PCT/US2017/058854, filed Oct. 27, 2017, both of which are incorporated by reference in their entirety herein.

STATEMENT REGARDING FEDERALLY SPONSORED RESEARCH OR DEVELOPMENT

N/A

BACKGROUND

Electronic displays are a nearly ubiquitous medium for communicating information to users of a wide variety of devices and products. Most commonly employed electronic displays include the cathode ray tube (CRT), plasma display panels (PDP), liquid crystal displays (LCD), electroluminescent displays (EL), organic light emitting diode (OLED) and active matrix OLEDs (AMOLED) displays, electrophoretic displays (EP) and various displays that employ electromechanical or electrofluidic light modulation (e.g., digital micromirror devices, electrowetting displays, etc.). Generally, electronic displays may be categorized as either active displays (i.e., displays that emit light) or passive displays (i.e., displays that modulate light provided by another source). Among the most obvious examples of active displays are CRTs, PDPs and OLEDs/AMOLEDs. Displays that are typically classified as passive when considering emitted light are LCDs and EP displays. Passive displays, while often exhibiting attractive performance characteristics including, but not limited to, inherently low power consumption, may find somewhat limited use in many practical applications given the lack of an ability to emit light.

To overcome the limitations of passive displays associated with emitted light, many passive displays are coupled to an external light source. The coupled light source may allow these otherwise passive displays to emit light and function substantially as an active display. Examples of such coupled light sources are backlights. A backlight may serve as a source of light (often a panel backlight) that is placed behind an otherwise passive display to illuminate the passive display. For example, a backlight may be coupled to an LCD or an EP display. The backlight emits light that passes through the LCD or the EP display. The light emitted is modulated by the LCD or the EP display and the modulated light is then emitted, in turn, from the LCD or the EP display. Often backlights are configured to emit white light. Color filters are then used to transform the white light into various colors used in the display. The color filters may be placed at an output of the LCD or the EP display (less common) or between the backlight and the LCD or the EP display, for example.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Certain examples and embodiments have other features that are one of in addition to and in lieu of the features illustrated in the above-referenced figures. These and other features are detailed below with reference to the above-referenced figures.

DETAILED DESCRIPTION

Examples and embodiments in accordance with the principles described herein provide a transparent display and transparent display system that enable viewing a background scene through the transparent display. Further, an image displayed by the transparent display may be superimposed on and viewed together with the background scene, according to various embodiments consistent with the principles described herein. In some embodiments described herein, a transparent display is provided that employs a light guide and a plurality of scattering elements as a backlight to illuminate an array of light valves of the transparent display. The scattering elements may provide diffuse light configured to provide the displayed image as a two-dimensional (2D) image, according to some embodiments. In other embodiments, the transparent display may be a multiview transparent display configured to provide a multiview image as the displayed image. Uses of the transparent displays described herein include various display applications such as, but not limited to, augmented reality displays.

Herein a 'two-dimensional display' or '2D display' is defined as a display configured to provide a view of an image that is substantially the same regardless of a direction from which the image is viewed (i.e., within a predefined viewing angle or range of the 2D display). A conventional liquid crystal display (LCD) found in may smart phones and computer monitors are examples of 2D displays. In contrast herein, a 'multiview display' is defined as an electronic display or display system configured to provide different views of a multiview image in or from different view directions. In particular, the different views may represent different perspective views of a scene or object of the multiview image.

A view direction or equivalently a light beam having a direction corresponding to a view direction of a multiview display generally has a principal angular direction given by angular components $\{\theta, \phi\}$, by definition herein. The angular component B may be referred to as an 'elevation component' or 'elevation angle' of the light beam. The angular component $\phi$ may be referred to as an 'azimuth component' or 'azimuth angle' of the light beam. By definition, the elevation angle $\theta$ is an angle in a vertical plane (e.g., perpendicular to a plane of a display screen while the azimuth angle $\phi$ is an angle in a horizontal plane (e.g., parallel to the display screen plane).

Figure 1:
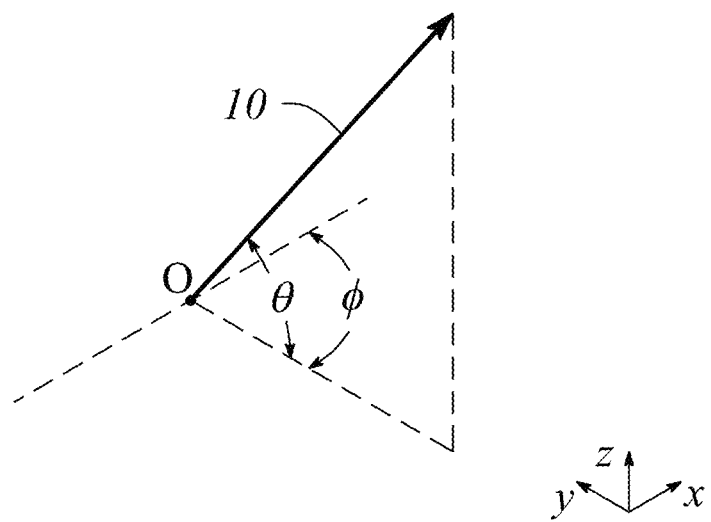
FIG. 1 illustrates a graphical representation of angular components of a light beam having a particular principal angular direction corresponding to a view direction of a multiview display in an example, according to an embodiment consistent with the principles described herein.

FIG. 1 illustrates a graphical representation of the angular components $\{\theta, \phi\}$ of a light beam 10 having a particular principal angular direction or simply 'direction.' The principal angular direction of the light beam 10 may correspond to a view direction of a multiview display, for example. In addition, the light beam 10 is emitted or emanates from a particular point, by definition herein. That is, by definition, the light beam 10 has a central ray associated with a particular point of origin within the multiview display. FIG. 1 also illustrates the light beam (or view direction) point of origin O.

Herein, the term 'multiview' as used in the terms 'multiview image' and 'multiview display' is defined as a plurality of views representing different perspectives or including angular disparity between views of the view plurality. In addition, herein the term 'multiview' explicitly includes more than two different views (i.e., a minimum of three views and generally more than three views), by definition herein. As such, 'multiview display' as employed herein is explicitly distinguished from a stereoscopic display that includes only two different views to represent a scene or an image. Note however, while multiview images and multiview displays may include more than two views, by definition herein, multiview images may be viewed (e.g., on a multiview display) as a stereoscopic pair of images by selecting only two of the multiview views to view at a time (e.g., one view per eye).

A 'multiview pixel' is defined herein as a set of sub-pixels or 'view' pixels in each of a similar plurality of different views of a multiview display. In particular, a multiview pixel may have an individual view pixels corresponding to or representing a view pixel in each of the different views of the multiview image. Moreover, the view pixels of the multiview pixel are so-called 'directional pixels' in that each of the view pixels is associated with a predetermined view direction of a corresponding one of the different views, by definition herein. Further, according to various examples and embodiments, the different view pixels of a multiview pixel may have equivalent or at least substantially similar locations or coordinates in each of the different views. For example, a first multiview pixel may have individual view pixels located at $\{x_1, y_1\}$ in each of the different views of a multiview image, while a second multiview pixel may have individual view pixels located at $\{x_2, y_2\}$ in each of the different views, and so on.

Herein, a 'light guide' is defined as a structure that guides light within the structure using total internal reflection or 'TIR'. In particular, the light guide may include a core that is substantially transparent at an operational wavelength of the light guide. In various examples, the term 'light guide' generally refers to a dielectric optical waveguide that employs total internal reflection to guide light at an interface between a dielectric material of the light guide and a material or medium that surrounds that light guide. By definition, a condition for total internal reflection is that a refractive index of the light guide is greater than a refractive index of a surrounding medium adjacent to a surface of the light guide material. In some embodiments, the light guide may include a coating in addition to or instead of the aforementioned refractive index difference to further facilitate the total internal reflection. The coating may be a reflective coating, for example. The light guide may be any of several light guides including, but not limited to, one or both of a plate or slab guide and a strip guide.

Further herein, the term 'plate' when applied to a light guide as in a 'plate light guide' is defined as a piece-wise or differentially planar layer or sheet, which is sometimes referred to as a 'slab' guide. In particular, a plate light guide is defined as a light guide configured to guide light in two substantially orthogonal directions bounded by a top surface and a bottom surface (i.e., opposite surfaces) of the light guide. Further, by definition herein, the top and bottom surfaces are both separated from one another and may be substantially parallel to one another in at least a differential sense. That is, within any differentially small section of the plate light guide, the top and bottom surfaces are substantially parallel or co-planar.

In some embodiments, the plate light guide may be substantially flat (i.e., confined to a plane) and therefore, the plate light guide is a planar light guide. In other embodiments, the plate light guide may be curved in one or two orthogonal dimensions. For example, the plate light guide may be curved in a single dimension to form a cylindrical shaped plate light guide. However, any curvature has a radius of curvature sufficiently large to insure that total internal reflection is maintained within the plate light guide to guide light.

Herein, an 'angle-preserving scattering feature,' an 'angle-preserving scattering element' or equivalently an 'angle-preserving scatterer' is any feature or scatterer configured to scatter light in a manner that substantially preserves in scattered light an angular spread of light incident on the feature or scatterer. In particular, by definition, an angular spread $\sigma_s$ of light scattered by an angle-preserving scattering element is a function of an angular spread $\sigma$ of the incident light (i.e., $\sigma_s = f(\sigma)$). In some embodiments, the angular spread $\sigma_s$ of the scattered light is a linear function of the angular spread or collimation factor $\sigma$ of the incident light (e.g., $\sigma_s = a \cdot \sigma$, where a is an integer). That is, the angular spread $\sigma_s$ of light scattered by an angle-preserving scattering element may be substantially proportional to the angular spread or collimation factor $\sigma$ of the incident light. For example, the angular spread $\sigma_s$ of the scattered light may be substantially equal to the incident light angular spread $\sigma$ (e.g., $\sigma_s \neq \sigma$). A uniform diffraction grating (i.e., a diffraction grating having a substantially uniform or constant diffractive feature spacing or grating pitch) is an example of an angle-preserving scattering element. In contrast, a Lambertian scatterer or a Lambertian reflector as well as a general diffuser (e.g., having or approximating Lambertian scattering) are not angle-preserving scatterers, by definition herein.

Herein, a 'polarization-preserving scattering feature,' a 'polarization-preserving scattering element' or equivalently a 'polarization-preserving scatterer' is any feature or scatterer configured to scatter light in a manner that substantially preserves in scattered light a polarization or at least a degree of polarization of the light incident on the feature or scatterer. Accordingly, a 'polarization-preserving scattering element' is any feature or scatterer where a degree of polarization of a light incident on the feature or scatterer is substantially equal to the degree of polarization of the scattered light. Further, by definition, 'polarization-preserving scattering' is scattering (e.g., of guided light) that preserves or substantially preserves a predetermined polarization of the light being scattered. The light being scattered may be polarized light provided by a polarized light source, for example.

Herein, a 'diffraction grating' is generally defined as a plurality of features (i.e., diffractive features) arranged to provide diffraction of light incident on the diffraction grating. In some examples, the plurality of features may be arranged in a periodic or quasi-periodic manner. For example, the diffraction grating may include a plurality of features (e.g., a plurality of grooves or ridges in a material surface) arranged in a one-dimensional (1D) array. In other examples, the diffraction grating may be a two-dimensional (2D) array of features. The diffraction grating may be a 2D array of bumps on or holes in a material surface, for example.

As such, and by definition herein, the 'diffraction grating' is a structure that provides diffraction of light incident on the diffraction grating. If the light is incident on the diffraction grating from a light guide, the provided diffraction or diffractive scattering may result in, and thus be referred to as, 'diffractive coupling' in that the diffraction grating may couple light out of the light guide by diffraction. The diffraction grating also redirects or changes an angle of the light by diffraction (i.e., at a diffractive angle). In particular, as a result of diffraction, light leaving the diffraction grating generally has a different propagation direction than a propagation direction of the light incident on the diffraction grating (i.e., incident light). The change in the propagation direction of the light by diffraction is referred to as 'diffractive redirection' herein. Hence, the diffraction grating may be understood to be a structure including diffractive features that diffractively redirects light incident on the diffraction grating and, if the light is incident from a light guide, the diffraction grating may also diffractively couple out the light from the light guide.

Further, by definition herein, the features of a diffraction grating are referred to as 'diffractive features' and may be one or more of at, in and on a material surface (i.e., a boundary between two materials). The surface may be a surface of a light guide, for example. The diffractive features may include any of a variety of structures that diffract light including, but not limited to, one or more of grooves, ridges, holes and bumps at, in or on the surface. For example, the diffraction grating may include a plurality of substantially parallel grooves in the material surface. In another example, the diffraction grating may include a plurality of parallel ridges rising out of the material surface. The diffractive features (e.g., grooves, ridges, holes, bumps, etc.) may have any of a variety of cross sectional shapes or profiles that provide diffraction including, but not limited to, one or more of a sinusoidal profile, a rectangular profile (e.g., a binary diffraction grating), a triangular profile and a saw tooth profile (e.g., a blazed grating).

According to various examples described herein, a diffraction grating (e.g., a diffraction grating of a scattering element or alternatively of a multibeam element, as described below) may be employed to diffractively scatter or couple light out of a light guide (e.g., a plate light guide) as a light beam. In particular, a diffraction angle $\theta_m$ of or provided by a locally periodic diffraction grating may be given by equation (1) as:

$$\theta_m = \sin^{-1}\left(n \sin \theta_i - \frac{m\lambda}{d}\right) \quad (1)$$

where $\lambda$ is a wavelength of the light, m is a diffraction order, n is an index of refraction of a light guide, d is a distance or spacing between features of the diffraction grating, $\theta_i$ is an angle of incidence of light on the diffraction grating. For simplicity, equation (1) assumes that the diffraction grating is adjacent to a surface of the light guide and a refractive index of a material outside of the light guide is equal to one (i.e., $n_{out}=1$). In general, the diffraction order m is given by an integer. A diffraction angle $\theta_m$ of a light beam produced by the diffraction grating may be given by equation (1) where the diffraction order is positive (e.g., m>0). For example, first-order diffraction is provided when the diffraction order m is equal to one (i.e., m=1).

Figure 2:
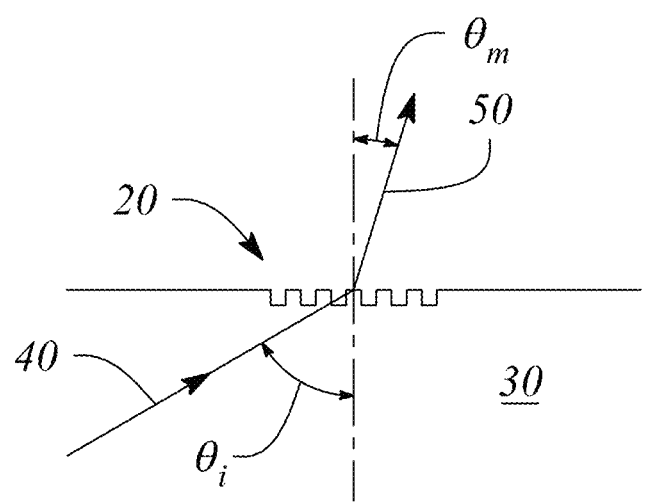
FIG. 2 illustrates a cross sectional view of a diffraction grating in an example, according to an embodiment consistent with the principles described herein.

FIG. 2 illustrates a cross sectional view of a diffraction grating 20 in an example, according to an embodiment consistent with the principles described herein. For example, the diffraction grating 20 may be located on a surface of a light guide 30. In addition, FIG. 2 illustrates a light beam 40 incident on the diffraction grating 20 at an incident angle $\theta_i$. The incident light beam 40 may be a beam of guided light (i.e., a guided light beam) within the light guide 30. Also illustrated is a directional light beam 50 diffractively produced and coupled-out by the diffraction grating 20 as a result of diffraction of the incident light beam 40. The directional light beam 50 has a diffraction angle $\theta_m$ (or 'principal angular direction' herein) as given by equation (1). The diffraction angle $\theta_m$ may correspond to a diffraction order 'm' of the diffraction grating 20, for example diffraction order m=1 (i.e., a first diffraction order).

By definition herein, a 'multibeam element' is a structure or element of a backlight or a display that produces light that includes a plurality of light beams. In some embodiments, the multibeam element may be optically coupled to a light guide of a backlight to provide the plurality of light beams by coupling or scattering out a portion of light guided in the light guide. Further, the light beams of the plurality of light beams produced by a multibeam element have different principal angular directions from one another, by definition herein. In particular, by definition, a light beam of the plurality has a predetermined principal angular direction that is different from another light beam of the light beam plurality. As such, the light beam is referred to as a 'directional light beam' and the light beam plurality may be termed a 'directional light beam plurality, by definition herein. Furthermore, the directional light beam plurality may represent a light field. For example, the directional light beam plurality may be confined to a substantially conical region of space or have a predetermined angular spread that includes the different principal angular directions of the light beams in the light beam plurality. As such, the predetermined angular spread of the light beams in combination (i.e., the light beam plurality) may represent the light field.

According to various embodiments, the different principal angular directions of the various directional light beams of the plurality are determined by a characteristic including, but not limited to, a size (e.g., length, width, area, etc.) of the multibeam element. In some embodiments, the multibeam element may be considered an 'extended point light source', i.e., a plurality of point light sources distributed across an extent of the multibeam element, by definition herein. Further, a directional light beam produced by the multibeam element has a principal angular direction given by angular components $\{\theta, \phi\}$, by definition herein, and as described above with respect to FIG. 1.

Herein a 'collimator' is defined as substantially any optical device or apparatus that is configured to collimate light. For example, a collimator may include, but is not limited to, a collimating mirror or reflector, a collimating lens, a diffraction grating, a tapered light guide, and various combinations thereof. According to various embodiments, an amount of collimation provided by the collimator may vary in a predetermined degree or amount from one embodiment to another. Further, the collimator may be configured to provide collimation in one or both of two orthogonal directions (e.g., a vertical direction and a horizontal direction). That is, the collimator may include a shape or similar collimating characteristic in one or both of two orthogonal directions that provides light collimation, according to some embodiments.

Herein, a 'collimation factor' is defined as a degree to which light is collimated. In particular, a collimation factor defines an angular spread of light rays within a collimated beam of light, by definition herein. For example, a collimation factor $\sigma$ may specify that a majority of light rays in a beam of collimated light is within a particular angular spread (e.g., +/−$\sigma$ degrees about a central or principal angular direction of the collimated light beam). The light rays of the collimated light beam may have a Gaussian distribution in terms of angle and the angular spread may be an angle determined by at one-half of a peak intensity of the collimated light beam, according to some examples.

Herein, a 'light source' is defined as a source of light (e.g., an optical emitter configured to produce and emit light). For example, the light source may comprise an optical emitter such as a light emitting diode (LED) that emits light when activated or turned on. In particular, herein the light source may be substantially any source of light or comprise substantially any optical emitter including, but not limited to, one or more of a light emitting diode (LED), a laser, an organic light emitting diode (OLED), a polymer light emitting diode, a plasma-based optical emitter, a fluorescent lamp, an incandescent lamp, and virtually any other source of light. The light produced by the light source may have a color (i.e., may include a particular wavelength of light), or may be a range of wavelengths (e.g., white light). In some embodiments, the light source may comprise a plurality of optical emitters. For example, the light source may include a set or group of optical emitters in which at least one of the optical emitters produces light having a color, or equivalently a wavelength, that differs from a color or wavelength of light produced by at least one other optical emitter of the set or group. The different colors may include primary colors (e.g., red, green, blue) for example. A 'polarized' light source is defined herein as substantially any light source that produces or provides light having a predetermined polarization. For example, the polarized light source may comprise a polarizer at an output of an optical emitter of the light source.

Further, as used herein, the article 'a' is intended to have its ordinary meaning in the patent arts, namely 'one or more'. For example, 'a scattering element' means one or more scattering elements and as such, 'the scattering element' means 'the scattering element(s)' herein. Also, any reference herein to 'top', 'bottom', 'upper', 'lower', 'up', 'down', 'front', 'back', 'first', 'second', 'left' or 'right' is not intended to be a limitation herein. Herein, the term 'about' when applied to a value generally means within the tolerance range of the equipment used to produce the value, or may mean plus or minus 10%, or plus or minus 5%, or plus or minus 1%, unless otherwise expressly specified. Further, the term 'substantially' as used herein means a majority, or almost all, or all, or an amount within a range of about 51% to about 100%. Moreover, examples herein are intended to be illustrative only and are presented for discussion purposes and not by way of limitation.

Figure 3A:
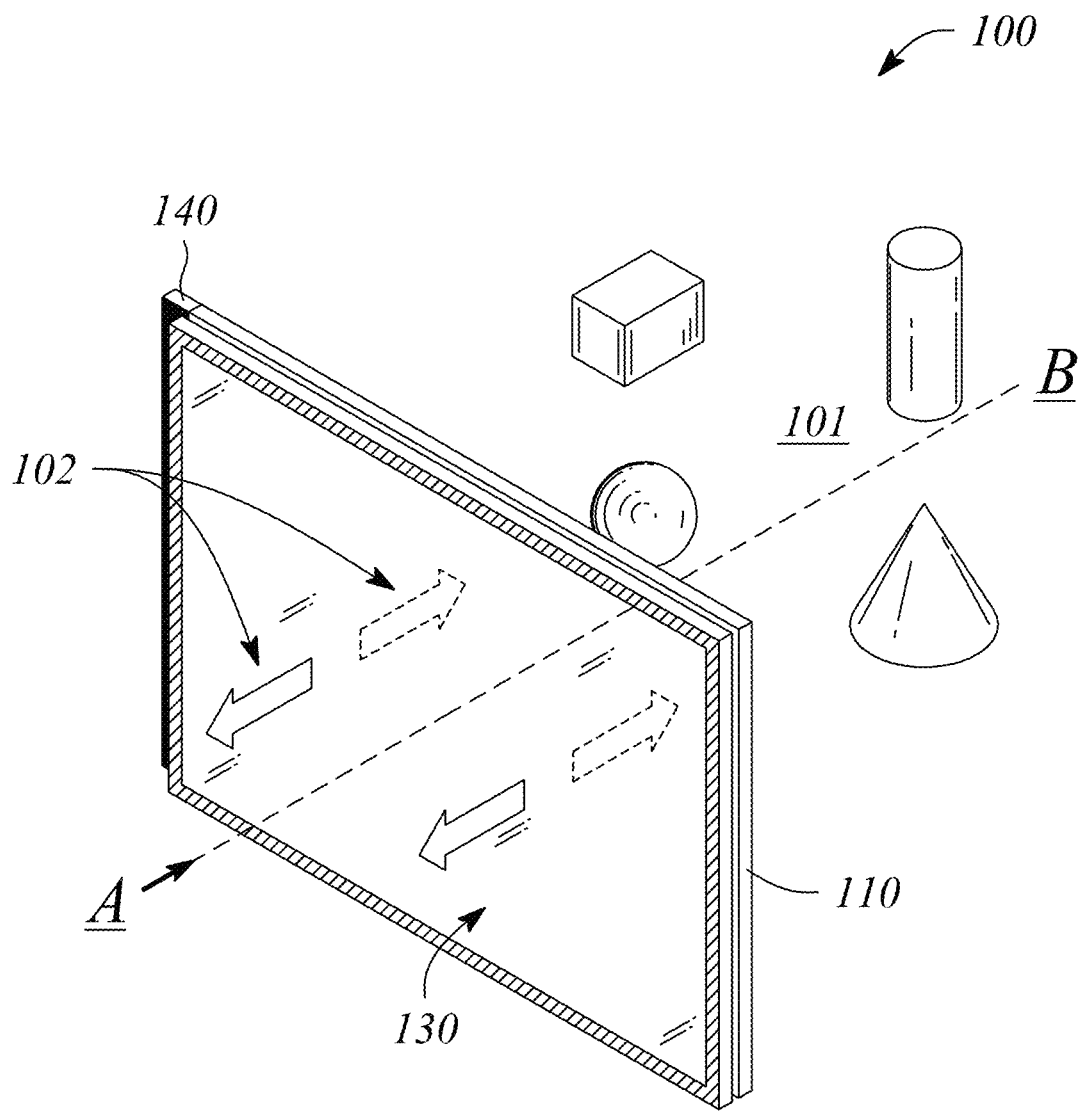
FIG. 3A illustrates a perspective view of a backlit transparent display in an example, according to an embodiment consistent with the principles described herein.
Figure 3B:
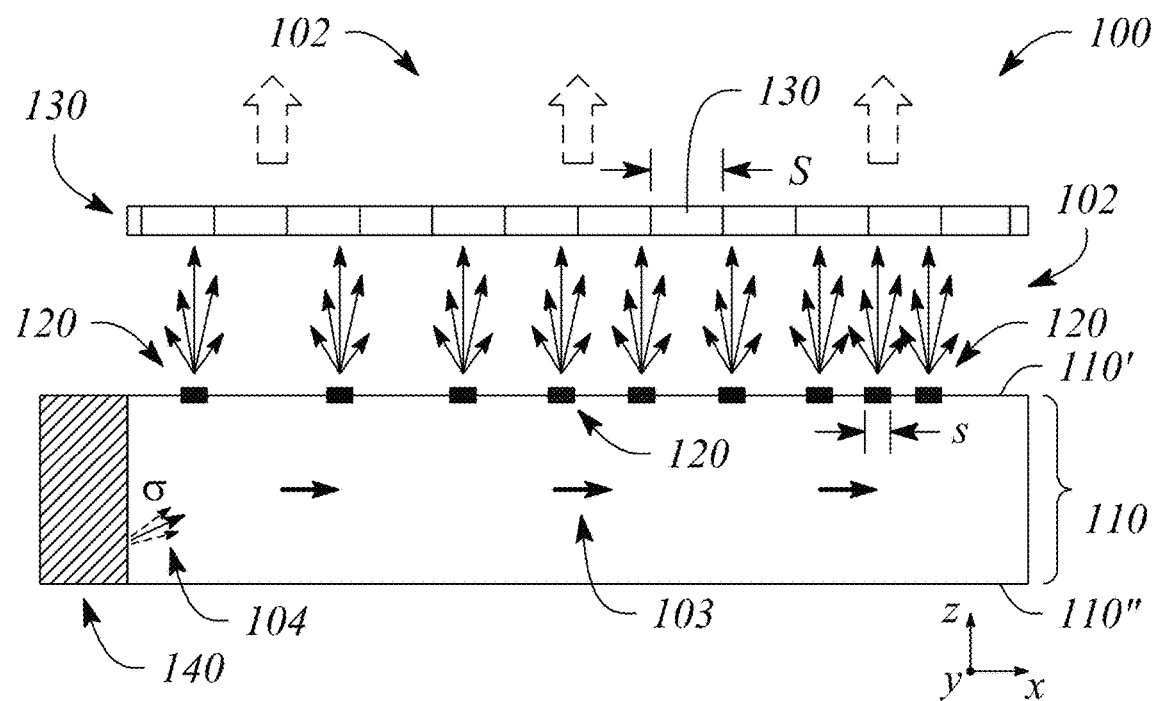
FIG. 3B illustrates a cross sectional view of a backlit transparent display in an example, according to an embodiment consistent with the principles described herein.
Figure 3C:
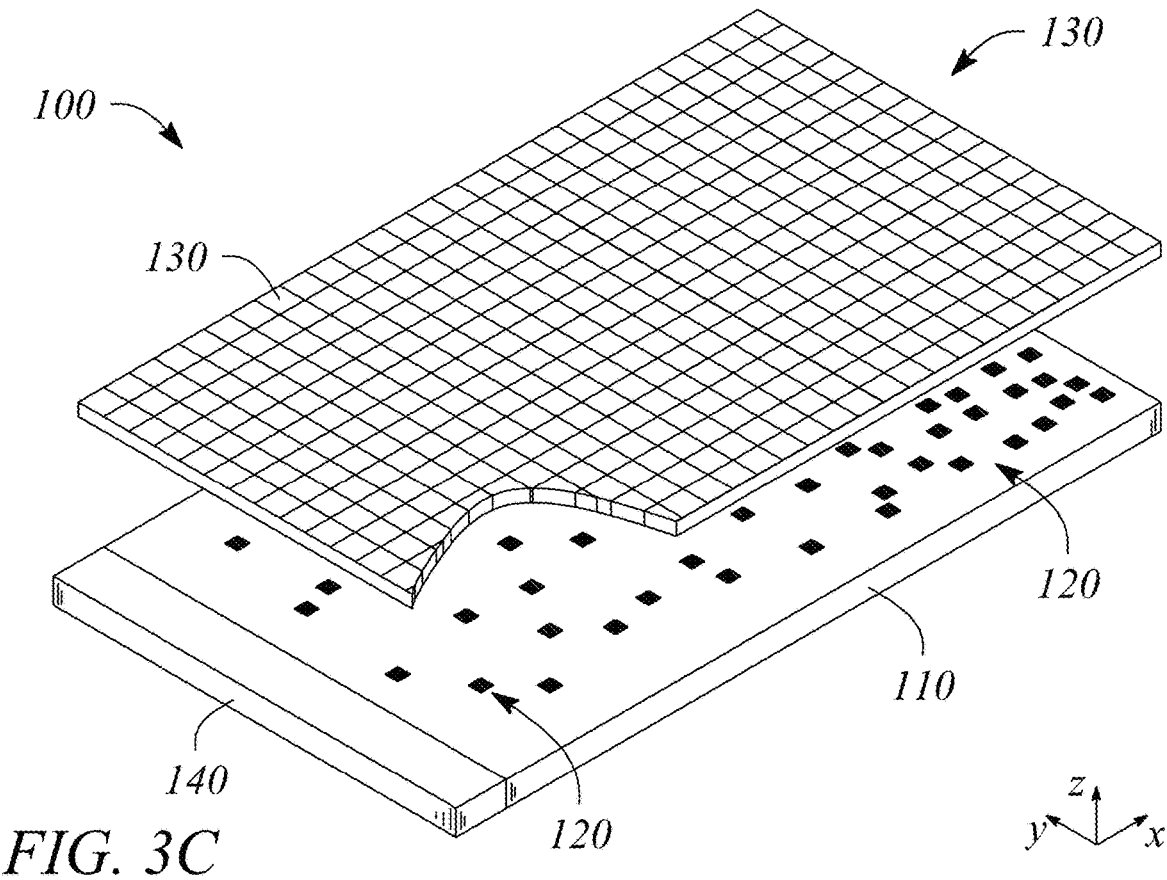
FIG. 3C illustrates another perspective view of a backlit transparent display in an example, according to an embodiment consistent with the principles described herein.

According to some embodiments of the principles described herein, a backlit transparent display is provided. FIG. 3A illustrates a perspective view of a backlit transparent display 100 in an example, according to an embodiment consistent with the principles described herein. FIG. 3B illustrates a cross sectional view of a backlit transparent display 100 in an example, according to an embodiment consistent with the principles described herein. FIG. 3C illustrates another perspective view of a backlit transparent display 100 in an example, according to an embodiment consistent with the principles described herein. The perspective view in FIG. 3C is illustrated with a partial cut-away to facilitate discussion herein only.

The backlit transparent display 100 illustrated in FIGS. 3A-3C is configured to provide emitted light 102 that is subsequently modulated to represent a displayed image. In particular, the emitted light 102 provided by the backlit transparent display 100 is directed away from the backlit transparent display 100 one or both of toward a viewer and toward a background scene 101, according to various embodiments. Further, the emitted light 102 is modulated (e.g., using an array of light valves, as described below) to provide or 'display' the displayed image. According to various embodiments, emitted light 102 that is directed toward a viewer may be directly modulated (e.g., after emission) to represent the displayed image, while emitted light 102 the is direct toward the background scene 101 may be modulated to represent the displayed image only after being reflected by the background scene 101 or objects therein. For example, the emitted light 102 may serve as an illumination source of the background scene 101. Emitted light 102 that, in turn, is reflected by the background scene 101 may then be modulated to represent the displayed image, for example. In some embodiments, the displayed image may include two-dimensional (2D) content and thus may represent or be a 2D image. In other embodiments, the displayed image may include three-dimensional (3D) content (e.g., virtual objects represented in different perspective views that appear as 3D objects when viewed by a user) and thus may represent or be a 3D image.

Further, the backlit transparent display 100 is configured to enable the background scene 101 to be visible through the backlit transparent display 100. That is, the backlit transparent display 100 may enable a user to simultaneously view both the displayed image provided by the backlit transparent display 100 and the background scene 101. Moreover, the displayed image may be provided or may appear the viewer as being superimposed on or 'in' the background scene 101 when the background scene 101 is viewed through the backlit transparent display 100. Thus, the backlit transparent display 100 may provide an augmented reality (AR) experience to the user in which one or both of 2D and 3D virtual objects appears to be in or part of the background scene 101, according to some embodiments.

As illustrated in FIG. 3A, the user may view the backlit transparent display 100 from a position or region A and the background scene 101 may be located on an opposite side of the backlit transparent display 100 from that of region A, e.g., in region B. For example, the user may view a 'front' side of the backlit transparent display 100 (i.e., from region A) in a direction indicated by a bold arrow and dashed line. The background scene 101, in turn, may be located behind the backlit transparent display 100 in region B. FIG. 3A also illustrates emitted light 102 as being directed both toward the viewer in region A and toward the background scene 101 in region B, by way of example and not limitation.

The backlit transparent display 100 illustrated in FIGS. 3A-3C comprises a light guide 110. The light guide 110 may be a plate light guide, according to some embodiments. The light guide 110 is configured to guide light along a length of the light guide 110 as guided light 104. For example, the light guide 110 may include a dielectric material configured as an optical waveguide. The dielectric material may have a first refractive index that is greater than a second refractive index of a medium surrounding the dielectric optical waveguide. The difference in refractive indices is configured to facilitate total internal reflection of the guided light 104 according to one or more guided modes of the light guide 110, for example.

In particular, the light guide 110 may be a slab or plate optical waveguide comprising an extended, substantially planar sheet of optically transparent, dielectric material. The substantially planar sheet of dielectric material is configured to guide the guided light 104 using total internal reflection. According to various examples, the optically transparent material of the light guide 110 may include or be made up of any of a variety of dielectric materials including, but not limited to, one or more of various types of glass (e.g., silica glass, alkali-aluminosilicate glass, borosilicate glass, etc.) and substantially optically transparent plastics or polymers (e.g., poly(methyl methacrylate) or 'acrylic glass', polycarbonate, etc.). In some examples, the light guide 110 may further include a cladding layer (not illustrated) on at least a portion of a surface (e.g., one or both of the top surface and the bottom surface) of the light guide 110. The cladding layer may be used to further facilitate total internal reflection, according to some examples.

Further, according to some embodiments, the light guide 110 is configured to guide the guided light 104 according to total internal reflection at a non-zero propagation angle between a first surface 110' (e.g., 'front' surface or side) and a second surface 110" (e.g., 'back' surface or side) of the light guide 110, as illustrated in FIG. 3B. In particular, the guided light 104 propagates by reflecting or 'bouncing' between the first surface 110' and the second surface 110" of the light guide 110 at the non-zero propagation angle. In some embodiments, the guided light 104 comprises a plurality of guided light beams of different colors of light. The light beams of the plurality of guided light beams may be guided by the light guide 110 at respective ones of different color-specific, non-zero propagation angles. Note that the non-zero propagation angle is not illustrated for simplicity of illustration. However, a bold arrow depicting a propagation direction 103 illustrates a general propagation direction of the guided light 104 along the light guide length in FIG. 3B.

As defined herein, a 'non-zero propagation angle' is an angle relative to a surface (e.g., the first surface 110' or the second surface 110") of the light guide 110. Further, the non-zero propagation angle is both greater than zero and less than a critical angle of total internal reflection within the light guide 110, according to various embodiments. For example, the non-zero propagation angle of the guided light 104 may be between about ten (10) degrees and about fifty (50) degrees or, in some examples, between about twenty (20) degrees and about forty (40) degrees, or between about twenty-five (25) degrees and about thirty-five (35) degrees. For example, the non-zero propagation angle may be about thirty (30) degrees. In other examples, the non-zero propagation angle may be about 20 degrees, or about 25 degrees, or about 35 degrees. Moreover, a specific non-zero propagation angle may be chosen (e.g., arbitrarily) for a particular implementation as long as the specific non-zero propagation angle is chosen to be less than the critical angle of total internal reflection within the light guide 110.

The guided light 104 in the light guide 110 may be introduced or coupled into the light guide 110 at the non-zero propagation angle (e.g., about 30-35 degrees). One or more of a lens, a mirror or similar reflector (e.g., a tilted collimating reflector), a diffraction grating, and a prism (not illustrated) may facilitate coupling light into an input end of the light guide 110 as the guided light 104 at the non-zero propagation angle, for example. Once coupled into the light guide 110, the guided light 104 propagates along the light guide 110 in a direction that may be generally away from the input end (e.g., illustrated by bold arrows pointing along an x-axis in FIG. 3B).

Further, the guided light 104 or equivalently the guided light 104 produced by coupling light into the light guide 110 may be collimated light, according to some embodiments. Herein, a 'collimated light' or 'collimated light beam' is generally defined as a light or more specifically as a beam of light in which rays of the light beam are substantially parallel to one another within the light beam (e.g., the guided light 104). Further, rays of light that diverge or are scattered from the collimated light beam are not considered to be part of the collimated light beam, by definition herein. The collimated light guided within the light guide 110 as the guided light 104 may be collimated according to or having a collimation factor σ, in various embodiments.

In some embodiments, the light guide 110 may be configured to 'recycle' the guided light 104. In particular, the guided light 104 that has been guided along the light guide length may be redirected back along that length in another propagation direction that differs from the propagation direction 103. For example, the light guide 110 may include a reflector (not illustrated) at an end of the light guide 110 opposite to an input end adjacent to a source of the guided light 104. The reflector may be configured to reflect the guided light 104 back toward the input end as recycled guided light. Recycling guided light 104 in this manner may increase a brightness of the backlit transparent display 100 (e.g., increase an intensity of the emitted light 102) by making guided light available more than once, for example, to scattering elements, as described below.

As illustrated in FIGS. 3B-3C, the backlit transparent display 100 further comprises a plurality of scattering elements 120 spaced apart from one another along the light guide length. In particular, the scattering elements 120 of the scattering element plurality are separated from one another by a finite space and represent individual, distinct scattering elements along the light guide length, as illustrated. That is, by definition herein, the scattering elements 120 of the plurality are spaced apart from one another according to a finite (i.e., non-zero) inter-element distance (e.g., a finite center-to-center distance). Further the scattering elements 120 of the scattering element plurality generally do not intersect, overlap or otherwise touch one another, according to some embodiments. That is, each scattering element 120 is generally distinct and separated from other ones of the scattering elements 120 of the scattering element plurality.

According to some embodiments, the scattering elements 120 of the plurality may be arranged in either a one-dimensional (1D) array or two-dimensional (2D) array. For example, the plurality of scattering elements 120 may be arranged as a linear 1D array. In another example, the plurality of scattering elements 120 may be arranged as a rectangular 2D array or as a circular 2D array. In some embodiments, an arrangement of the scattering elements 120 within the array may be random or at least pseudorandom. That is, there may be different a spacing between adjacent scattering elements 120 at different points across the light guide 110 or equivalently across the array. In some embodiments, a spacing between adjacent scattering elements 120 or equivalently a local density of scattering elements 120 may be varied as a function of distance across the light guide 110 or equivalently across the array. In yet other embodiments, the distribution of scattering elements within the array (i.e., 1D or 2D array) may be a regular or substantially uniform. In particular, an inter-element distance (e.g., center-to-center distance or spacing) between the scattering elements 120 may be substantially uniform or constant across the array.

According to various embodiments, a scattering element 120 of the scattering element plurality is configured to couple or scatter out a portion of the guided light 104 as the emitted light 102. In particular, FIG. 3B illustrate the emitted light 102 as a plurality of diverging arrows depicted as being directed way from the first (or front) surface 110' of the light guide 110 by the scattering elements 120. The plurality of diverging arrows may represent diffusely scattered light and the emitted light 102 may be diffuse or substantially diffuse light, according to some embodiments.

In other embodiments (not illustrated in FIGS. 3A-3C), the emitted light 102 may be substantially directional. In particular, a scattering element 120 may comprise a multi-beam element configured to configured to scatter out a portion of the guided light 104 as a plurality of directional light beams having different principal angular directions corresponding to respective different view directions of a multiview image. In these embodiments, the emitted light 102 comprises the plurality of directional light beams. For example, the directional light beams of the emitted light 102 may represent a light field, according to some of these embodiments.

As illustrated in FIGS. 3A-3C, the backlit transparent display 100 further comprises an array of light valves 130. The array of light valves 130 is configured to modulate the emitted light 102 provided by the scattering elements 120. In particular, the light valve array may be configured to modulate the emitted light 102 as or to provide an image being displayed by the backlit transparent display 100, such as the displayed image. In FIG. 3C, the array of light valves 130 is partially cut-away to allow visualization of the light guide 110 and the scattering elements 120 underlying the light valve array. In various embodiments, any of a variety of different types of light valves may be employed as the light valves 130 of the light valve array including, but not limited to, one or more of liquid crystal light valves, electrophoretic light valves, and light valves based on or employing electrowetting. In FIG. 3B, the emitted light 102 exiting the light valve array is illustrated using dashed arrows to emphasize the modulation.

In some embodiments, a size of the scattering element 120 is less than or equal to a size of a light valve 130 of the light valve array of the backlit transparent display 100. For example, if the scattering element size is denoted 's' and the light valve size is denoted 'S' (e.g., as illustrated in FIG. 3B), then the scattering element size s may be given by equation (2) as $$s \leq S \quad (2)$$

Herein, the 'size' may be defined in any of a variety of manners to include, but not be limited to, a length, a width or an area. For example, the size Sofa light valve 130 may be a length thereof and the sizes of the scattering element 120 may also be a length of the scattering element 120. In another example, size may refer to an area such that an area of the scattering element 120 and an area of the light valve 130. The 'area' of the light valve 130 may refer an opening or aperture thereof, in some examples. In some embodiments, the size of the scattering element 120 may be less than about ninety percent (90%) of the light valve size. In other embodiments, the scattering element size may be less than about eighty percent (80%) of the light valve size, or less than about seventy percent (70%) of the light valve size, or less than about sixty percent (60%) of the light valve size, or less than about fifty percent (50%) of the light valve size.

According to various embodiments, the scattering elements 120 may comprise any of a number of different structures configured to couple out a portion of the guided light 104. For example, the different structures may include, but are not limited to, diffraction gratings, micro-reflective scattering elements, micro-refractive scattering elements (e.g., an inverted microprism), as well as various combinations thereof. In various embodiments, the scattering element 120 comprising a diffraction grating is configured to diffractively scatter or couple out the guided light portion as the emitted light 102. The scattering element 120 comprising a micro-reflective scattering element may configured to reflectively scatter or couple out the guided light portion as the emitted light 102, and the scattering element 120 comprising a micro-refractive scattering element may be configured to scatter or couple out the guided light portion as the emitted light 102 by or using refraction (i.e., refractively couple out the guided light portion). In some embodiments, the scattering element 120 may be a unidirectional scattering element configured to scatter light in substantially a single direction. In some embodiments, the scattering element 120 may be one or both of an angle-preserving scattering element and a polarization-preserving scattering element.

Figure 4A:
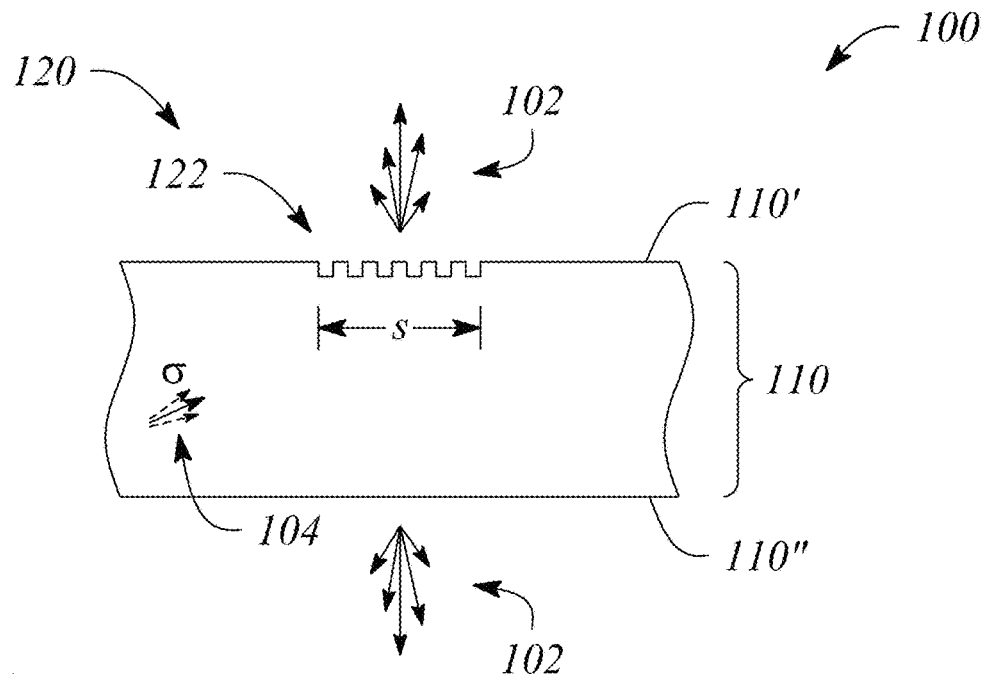
FIG. 4A illustrates a cross sectional view of a portion of a backlit transparent display including a scattering element in an example, according to an embodiment consistent with the principles described herein.
Figure 4B:
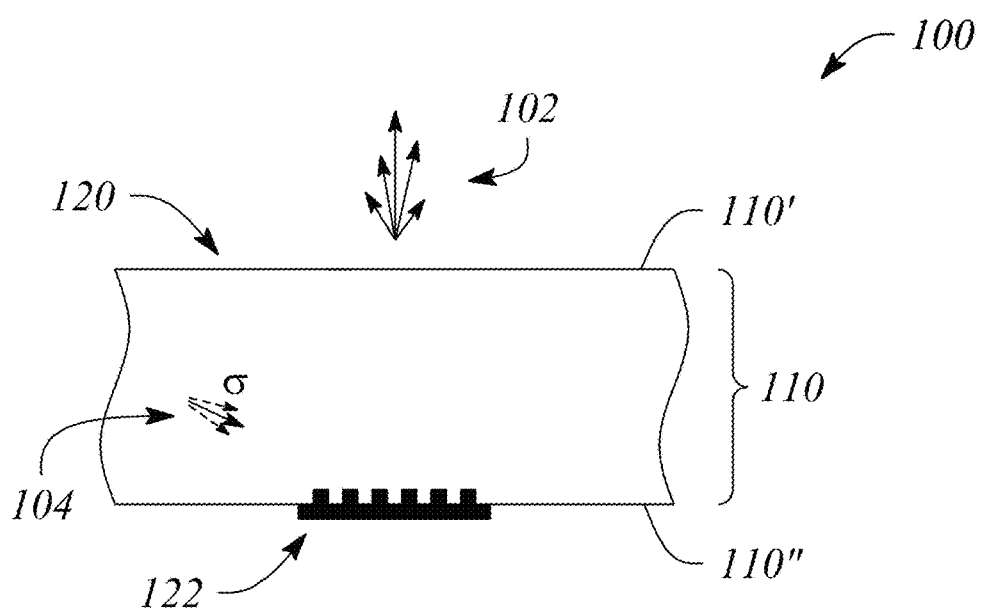
FIG. 4B illustrates a cross sectional view of a portion of a backlit transparent display including a scattering element in an example, according to another embodiment consistent with the principles described herein.

FIG. 4A illustrates a cross sectional view of a portion of a backlit transparent display 100 including a scattering element 120 in an example, according to an embodiment consistent with the principles described herein. FIG. 4B illustrates a cross sectional view of a portion of a backlit transparent display 100 including a scattering element 120 in an example, according to another embodiment consistent with the principles described herein. In particular, FIGS. 4A-4B illustrate the scattering element 120 of the backlit transparent display 100 comprising a diffraction grating 122. The diffraction grating 122 is configured to diffractively couple out a portion of the guided light 104 as the plurality of emitted light 102. The diffraction grating 122 comprises a plurality of diffractive features spaced apart from one another by a diffractive feature spacing or a diffractive feature or grating pitch configured to provide diffractive coupling out of the guided light portion. According to various embodiments, the spacing or grating pitch of the diffractive features in the diffraction grating 122 may be sub-wavelength (i.e., less than a wavelength of the guided light).

In some embodiments, the diffraction grating 122 of the scattering element 120 may be located at or adjacent to a surface of the light guide 110. For example, the diffraction grating 122 may be at or adjacent to the first surface 110' of the light guide 110, as illustrated in FIG. 4A. The diffraction grating 122 at light guide first surface 110' may be a transmission mode diffraction grating configured to diffractively couple out the guided light portion through the first surface 110' as the emitted light 102. A transmission mode diffraction grating may provide diffractive scattering in two directions, e.g., above and below the diffraction grating 122.

In another example, as illustrated in FIG. 4B, the diffraction grating 122 may be located at or adjacent to the second surface 110" of the light guide 110. When located at the second surface 110", the diffraction grating 122 may be a reflection mode diffraction grating. As a reflection mode diffraction grating, the diffraction grating 122 is configured to both diffract the guided light portion and reflect the diffracted guided light portion toward the first surface 110' to exit through the first surface 110' as the diffractively emitted light 102. A reflection mode diffraction grating is an example of a unidirectional scattering element. In particular, the reflection mode diffraction grating may be configured to provide diffractive scattering in only one direction, e.g., above the diffraction grating 122. In other embodiments (not illustrated), the diffraction grating may be located between the surfaces of the light guide 110, e.g., as one or both of a transmission mode diffraction grating and a reflection mode diffraction grating.

According to some embodiments, the diffractive features of the diffraction grating 122 may comprise one or both of grooves and ridges that are spaced apart from one another. The grooves or the ridges may comprise a material of the light guide 110, e.g., may be formed in a surface of the light guide 110. In another example, the grooves or the ridges may be formed from a material other than the light guide material, e.g., a film or a layer of another material on a surface of the light guide 110.

In some embodiments, the diffraction grating 122 of the scattering element 120 is a uniform diffraction grating in which the diffractive feature spacing is substantially constant or unvarying throughout the diffraction grating 122. In other embodiments, the diffraction grating 122 may be a chirped diffraction grating. By definition, the 'chirped' diffraction grating is a diffraction grating exhibiting or having a diffraction spacing of the diffractive features (i.e., the grating pitch) that varies across an extent or length of the chirped diffraction grating. In some embodiments, the chirped diffraction grating may have or exhibit a 'chirp' of or change in the diffractive feature spacing that varies linearly with distance. As such, the chirped diffraction grating is a 'linearly chirped' diffraction grating, by definition. In other embodiments, the chirped diffraction grating of the scattering element 120 may exhibit a non-linear chirp of the diffractive feature spacing. Various non-linear chirps may be used including, but not limited to, an exponential chirp, a logarithmic chirp or a chirp that varies in another, substantially non-uniform or random but still monotonic manner. Non-monotonic chirps such as, but not limited to, a sinusoidal chirp or a triangle or sawtooth chirp, may also be employed. Combinations of any of these types of chirps may also be employed.

Figure 5A:
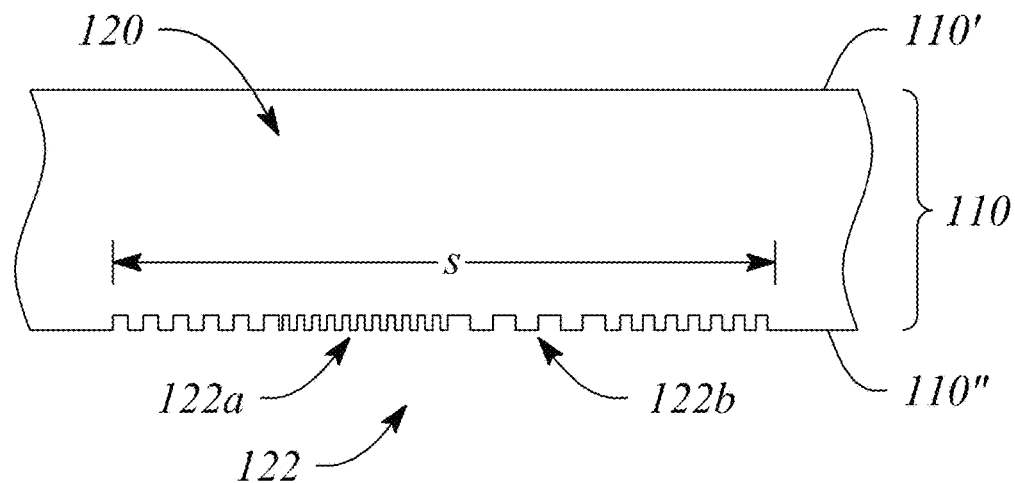
FIG. 5A illustrates a cross sectional view of a diffraction grating comprising a plurality of sub-gratings in an example, according to an embodiment consistent with the principles described herein.
Figure 5B:
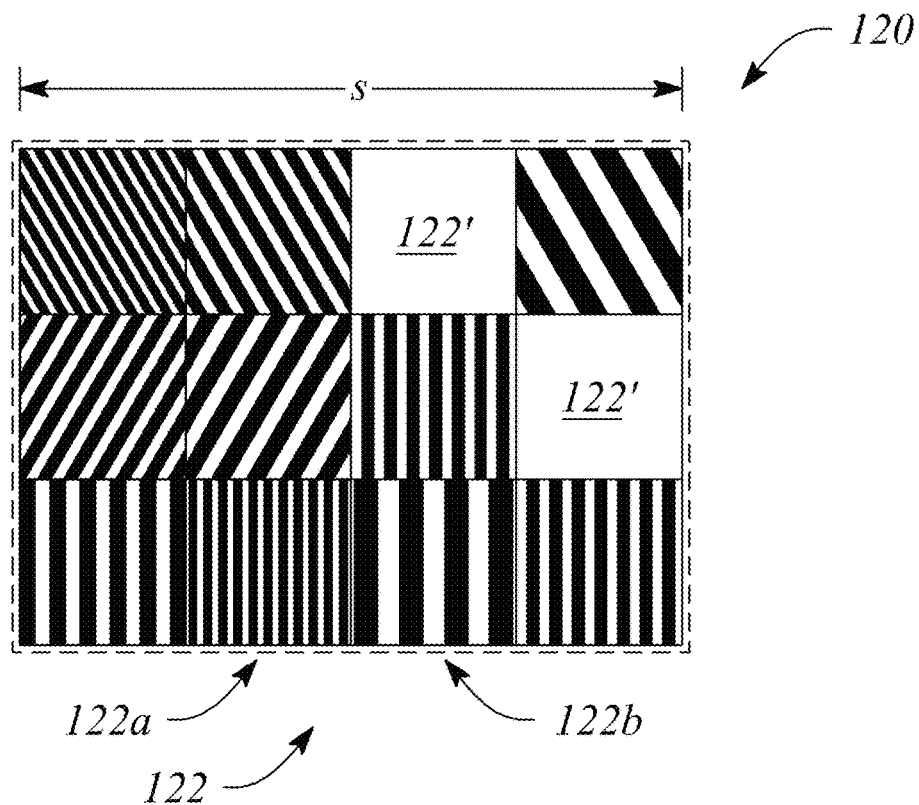
FIG. 5B illustrates a plan view of the diffraction grating illustrated in FIG. 5A in an example, according to an embodiment consistent with the principles described herein.

In some embodiments, the diffraction grating 122 may comprise a plurality of diffraction gratings or equivalently a plurality of sub-gratings. FIG. 5A illustrates a cross sectional view of a diffraction grating 122 comprising a plurality of sub-gratings in an example, according to an embodiment consistent with the principles described herein. FIG. 5B illustrates a plan view of the diffraction grating 122 illustrated in FIG. 5A in an example, according to an embodiment consistent with the principles described herein. The cross sectional view in FIG. 5A may represent a cross section taken from left to right through a bottom row of sub-gratings of the diffraction grating 122 illustrated in FIG. 5B, for example. As illustrated in FIGS. 5A and 5B, the plurality of sub-gratings comprises a first sub-grating 122a and a second sub-grating 122b within the diffraction grating 122 of the scattering element 120 on a surface (e.g., a second surface 110", as illustrated) of the light guide 110. A size s of the scattering element 120 is illustrated in both FIGS. 5A and 5B, while a boundary of the scattering element 120 is illustrated in FIG. 5B using a dashed line.

According to some embodiments, a differential density of sub-gratings within the diffraction grating 122 between different scattering elements 120 of the scattering element plurality may be configured to control a relative intensity of the emitted light 102 diffractively scattered out by respective different scattering elements 120. In other words, the scattering elements 120 may have different densities of diffraction gratings 122 therein and the different densities (i.e., the differential density of the sub-gratings) may be configured to control the relative intensity of the emitted light 102. In particular, a scattering element 120 having fewer sub-gratings within the diffraction grating 122 may produce emitted light 102 having a lower intensity (or beam density) than another scattering element 120 having relatively more sub-gratings. The differential density of sub-gratings may be provided using locations such as location 122' illustrated in FIG. 5B within the scattering element 120 that lack or are without a sub-grating, for example.

Figure 6:
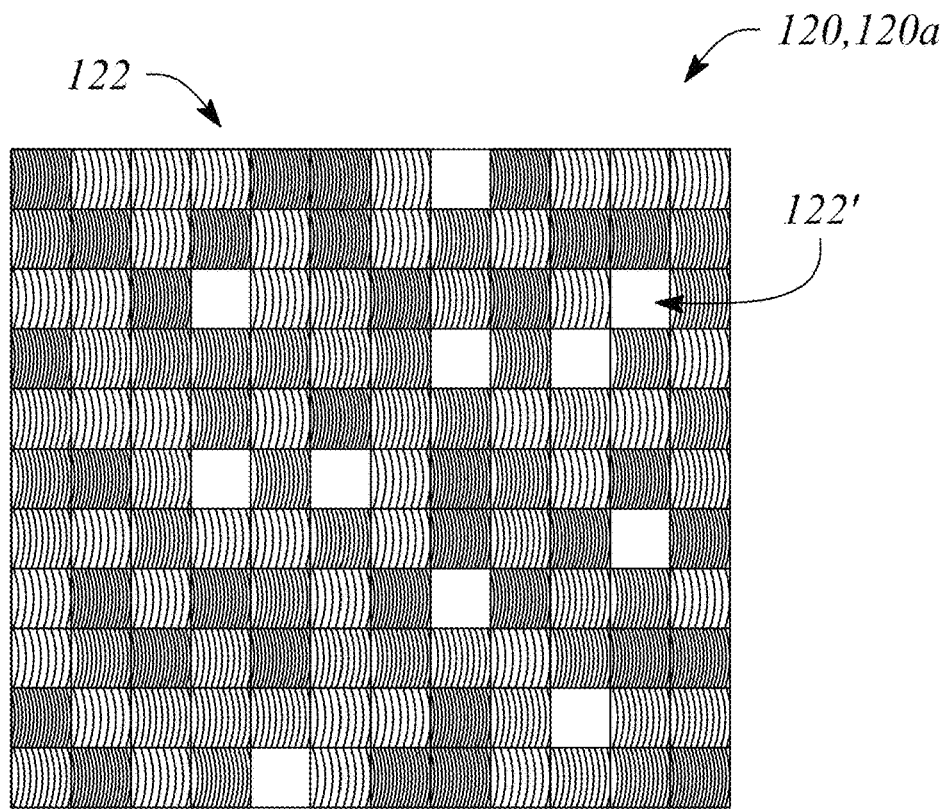
FIG. 6 illustrates a plan view of a pair of scattering elements in an example, according to an embodiment consistent with the principles described herein.
Figure 6:
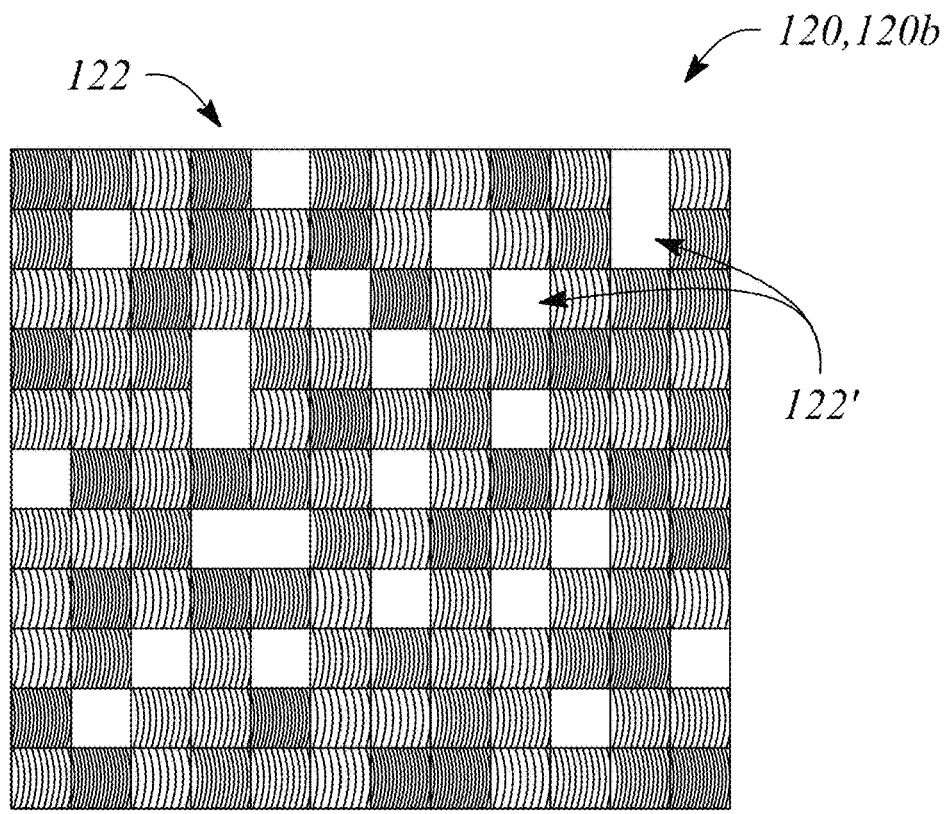

FIG. 6 illustrates a plan view of a pair of scattering elements 120 in an example, according to an embodiment consistent with the principles described herein. As illustrated, a first scattering element 120a of the pair has a higher density of sub-gratings within the diffraction grating 122 than are present in a second scattering element 120b of the pair. In particular, the second scattering element 120b has a diffraction grating 122 with fewer sub-gratings and more locations 122' without a sub-grating than the first scattering element 120a. In some embodiments, the higher density of sub-gratings in the first scattering element 120a may provide a plurality of directional light beams having a higher intensity than the intensity of the plurality of directional light beams provided by the second scattering element 120b. The higher and lower intensities of the respective directional light beam pluralities provided by the differential sub-grating densities illustrated in FIG. 6 may be used to compensate for a change in optical intensity of the guided light within the light guide as a function of propagation distance, according to some embodiments. By way of example and not limitation, FIG. 6 also illustrates diffraction gratings 122 with sub-gratings having curved diffractive features.

Figure 7A:
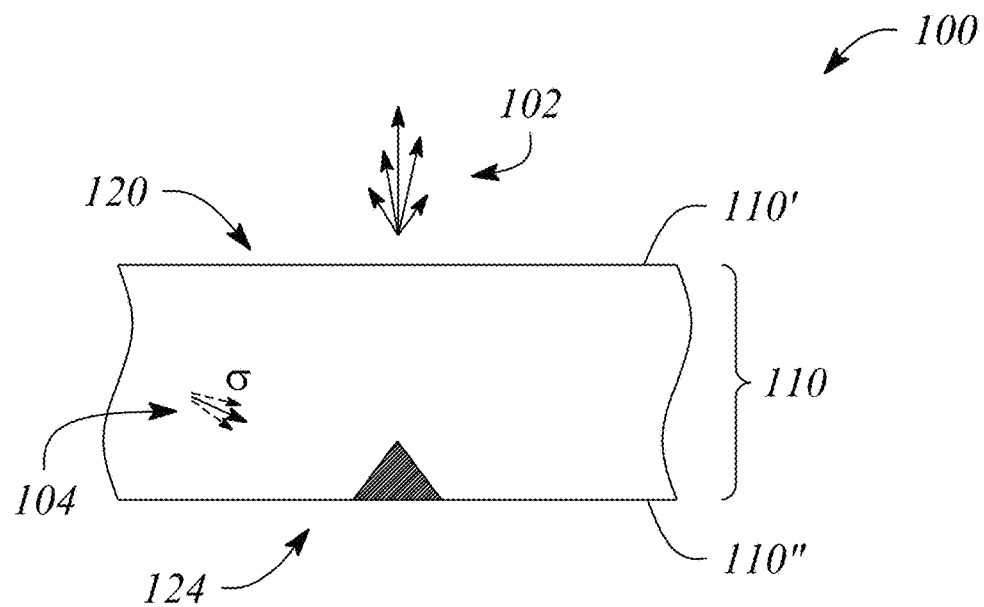
FIG. 7A illustrates a cross sectional view of a portion of a backlit transparent display including a scattering element in an example, according to another embodiment consistent with the principles described herein.
Figure 7B:
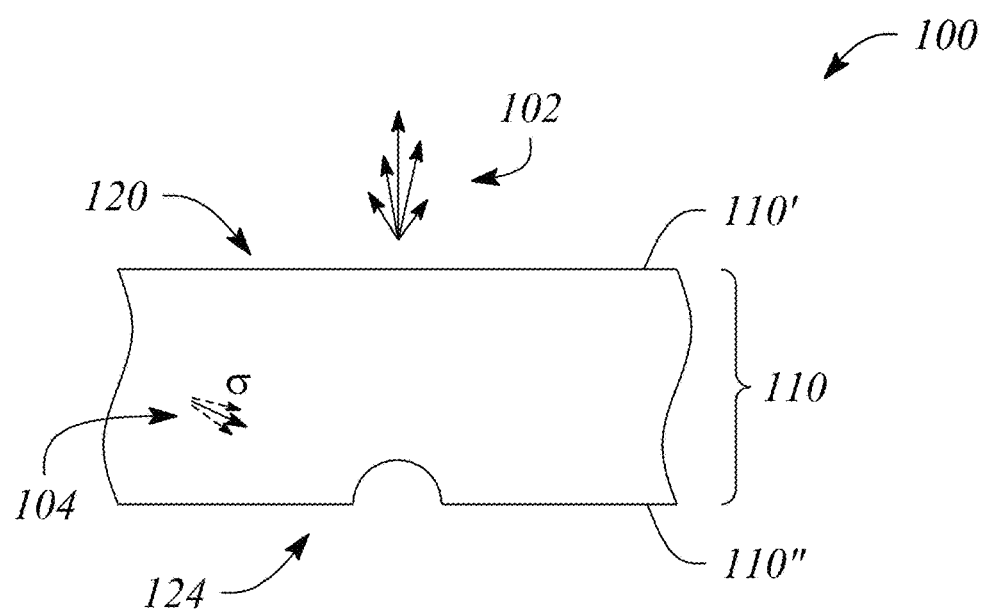
FIG. 7B illustrates a cross sectional view of a portion of a backlit transparent display including a scattering element in an example, according to another embodiment consistent with the principles described herein.

FIG. 7A illustrates a cross sectional view of a portion of a backlit transparent display 100 including a scattering element 120 in an example, according to another embodiment consistent with the principles described herein. FIG. 7B illustrates a cross sectional view of a portion of a backlit transparent display 100 including a scattering element 120 in an example, according to another embodiment consistent with the principles described herein. In particular, FIGS. 7A and 7B illustrate various embodiments of the scattering element 120 comprising a micro-reflective scattering element. Micro-reflective scattering elements used as or in the scattering element 120 may include, but are not limited to, a reflector that employs a reflective material or layer thereof (e.g., a reflective metal) or a reflector based on total internal reflection (TIR). According to some embodiments (e.g., as illustrated in FIGS. 7A-7B), the scattering element 120 comprising the micro-reflective scattering element may be located at or adjacent to a surface (e.g., the second surface 110") of the light guide 110. In other embodiments (not illustrated), the micro-reflective scattering element may be located within the light guide 110 between the first and second surfaces 110', 110".

For example, FIG. 7A illustrates the scattering element 120 comprising a micro-reflective scattering element 124 having reflective facets (e.g., a 'prismatic' micro-reflective scattering element) located adjacent to the second surface 110" of the light guide 110. The facets of the illustrated prismatic micro-reflective scattering element 124 are configured to reflect (i.e., reflectively scatter) the portion of the guided light 104 out of the light guide 110 as emitted light 102. The facets may be slanted or tilted (i.e., have a tilt angle) relative to a propagation direction of the guided light 104 to reflect the guided light portion out of light guide 110, for example. The facets may be formed using a reflective material within the light guide 110 (e.g., as illustrated in FIG. 7A) or may be surfaces of a prismatic cavity in the second surface 110", according to various embodiments. When a prismatic cavity is employed, either a refractive index change at the cavity surfaces may provide reflection (e.g., TIR reflection) or the cavity surfaces that form the facets may be coated by a reflective material to provide reflection, in some embodiments.

In another example, FIG. 7B illustrates the scattering element 120 comprising a micro-reflective scattering element 124 having a substantially smooth, curved surface such as, but not limited to, a semi-spherical micro-reflective scattering element 124. A specific surface curve of the micro-reflective scattering element 124 may be configured to reflect the guided light portion in different directions depending on a point of incidence on the curved surface with which the guided light 104 makes contact, for example. As illustrated in FIGS. 7A and 7B, the guided light portion that is reflectively scattered out of the light guide 110 exits or is emitted from the first surface 110', by way of example and not limitation. As with the prismatic micro-reflective scattering element 124 in FIG. 7A, the micro-reflective scattering element 124 in FIG. 7B may be either a reflective material within the light guide 110 or a cavity (e.g., a semi-circular cavity) formed in the second surface 110", as illustrated in FIG. 7B by way of example and not limitation.

Figure 8:
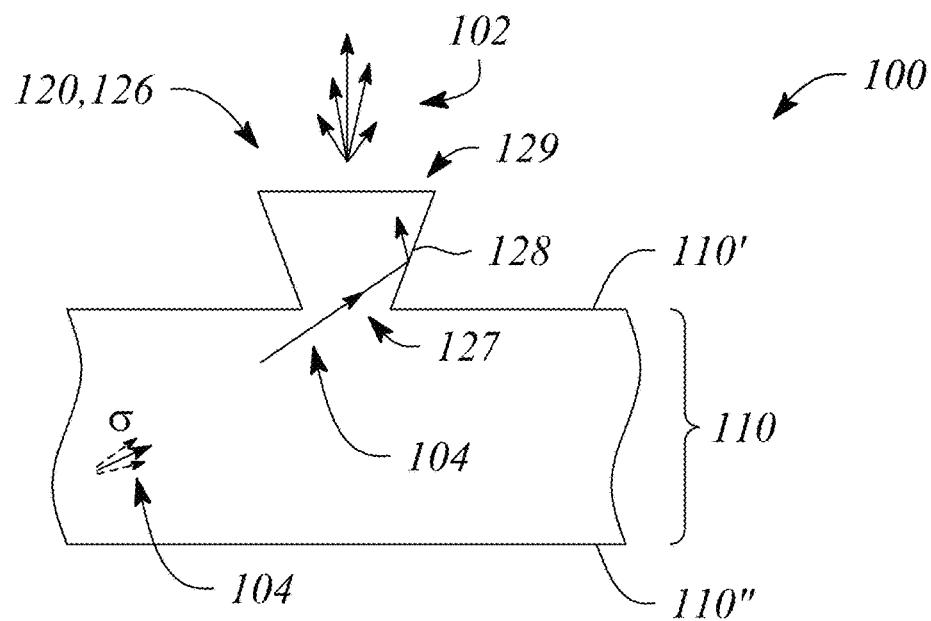
FIG. 8 illustrates a cross sectional view of a portion of a backlit transparent display including a scattering element in an example, according to another embodiment consistent with the principles described herein.

FIG. 8 illustrates a cross sectional view of a portion of a backlit transparent display 100 including a scattering element 120 in an example, according to another embodiment consistent with the principles described herein. In particular, FIG. 8 illustrates a scattering element 120 comprising a micro-refractive scattering element 126. According to various embodiments, the micro-refractive scattering element 126 is configured to refractively couple or scatter out a portion of the guided light 104 from the light guide 110. That is, the micro-refractive scattering element 126 is configured to employ refraction (e.g., as opposed to diffraction or reflection) to couple or scatter out the guided light portion from the light guide 110 as the emitted light 102. In some embodiments, the micro-refractive scattering element 126 may further employ reflection in scattering out the guided light portion, e.g., as illustrated in FIG. 8 and described below.

According to various embodiments, the micro-refractive scattering element 126 may have various shapes including, but not limited to, a semi-spherical shape, a rectangular shape or a prismatic shape (i.e., a shape having sloped facets). The micro-refractive scattering element 126 may extend or protrude out of a surface (e.g., the first surface 110') of the light guide 110, as illustrated, or may be a cavity in the surface (not illustrated). Further, the micro-refractive scattering element 126 may comprise a material of the light guide 110, in some embodiments. In other embodiments, the micro-refractive scattering element 126 may comprise another material adjacent to, and in some examples, in contact with the light guide surface.

In particular, the micro-refractive scattering element 126 illustrated in FIG. 8 comprises an inverted microprism, by way of example and not limitation. As illustrated, the inverted microprism of the micro-refractive scattering element 126 has a truncated conical or prismatic shape with an input aperture 127, an inclined sidewall 128, and an output aperture 129. In some embodiments, the micro-refractive scattering element 126 may comprise a plurality of inverted microprisms, e.g., within the size s of the micro-refractive scattering element 126.

The inverted microprism of the micro-refractive scattering element 126 is configured to scatter or couple out (or more generally to receive) a portion of the guided light 104. In particular, the inverted microprism is configured to receive the guided light 104 at or through the input aperture 127 and to provide or 'emit' light at the output aperture 129 as the emitted light 102 by reflecting the received guided light at the inclined sidewall(s) 128 of the inverted microprism. Herein, receiving the guided light portion through the input aperture 127 is refractive scattering, by definition, since it involves only a refractive index of materials on either side of the input aperture 127.

In various embodiments, the inverted microprism element may have a shape resembling or being substantially similar to a truncated cone, a truncated pyramid, and various other multi-sided structures. Further, a specific shape of the inverted microprism element 126 as well as a predetermined slope angle of the inclined sidewalls 128 thereof may be configured to control an angular shape or an angular intensity as well as other aspects of the emitted light 102. In some embodiments, the inclined sidewall 128 may further comprise a reflective layer or reflective material (e.g., a reflective material layer on an exterior surface of the inclined sidewall 128). The reflective layer may be configured to provide or enhance reflection at the interior surface of the inverted microprism. Alternatively, reflection at the interior surface of the inclined sidewalls may be provided by total internal reflection, obviating a need for the reflective layer. The micro-refractive scattering element 126 comprising the inverted microprism is another example of a unidirectional scattering element, according to various embodiments of the principles described herein.

Referring again to FIG. 3B, the backlit transparent display 100 may further comprise a light source 140. According to various embodiments, the light source 140 is configured to provide the light to be guided within light guide 110. In particular, the light source 140 may be located adjacent to an entrance surface or end (input end) of the light guide 110. In various embodiments, the light source 140 may comprise substantially any source of light (e.g., optical emitter) including, but not limited to, one or more light emitting diodes (LEDs) or a laser (e.g., laser diode). In some embodiments, the light source 140 may comprise an optical emitter configured produce a substantially monochromatic light having a narrowband spectrum denoted by a particular color. In particular, the color of the monochromatic light may be a primary color of a particular color space or color model (e.g., a red-green-blue (RGB) color model). In other examples, the light source 140 may be a substantially broadband light source configured to provide broadband or polychromatic light. For example, the light source 140 may provide white light. In some embodiments, the light source 140 may comprise a plurality of different optical emitters configured to provide different colors of light. The different optical emitters may be configured to provide light having different, color-specific, non-zero propagation angles corresponding to each of the different colors of light.

In some embodiments, the light source 140 may further comprise a collimator (not illustrated). The collimator may be configured to receive substantially uncollimated light from one or more of the optical emitters of the light source 140 and to convert the substantially uncollimated light into collimated light. In particular, the collimator may provide collimated light having the non-zero propagation angle and being collimated according to a predetermined collimation factor, according to some embodiments. Moreover, when optical emitters of different colors are employed, the collimator may be configured to provide the collimated light having one or both of different, color-specific, non-zero propagation angles and having different color-specific collimation factors. The collimator is further configured to communicate the collimated light to the light guide 110 to propagate as the guided light 104, described above.

In various embodiments, the backlit transparent display 100 is configured to be substantially transparent to light in a direction through the light guide 110 orthogonal to a propagation direction 103 of the guided light 104. In particular, the light guide 110 and the spaced apart scattering elements 120 of the scattering element plurality allow light to pass through the light guide 110 through both the first surface 110' and the second surface 110". Transparency may be facilitated, at least in part, due to both the relatively small size of the scattering elements 120 and the relatively large inter-element spacing of the scattering element 120. Further, especially when the scattering elements 120 comprise diffraction gratings, the scattering elements 120 may also be substantially transparent to light propagating orthogonal to the light guide surfaces 110', 110", in some embodiments. Further, the array of light valves 130 is configured to also be transparent to the orthogonally propagating light, at least in some instances (e.g., when the light valves are set to a clear or a 'white light' state). Thus, for example, light from the background scene 101 may pass in the orthogonal direction through the light guide 110 with the scattering element plurality and also through at least some of the light valves 130 of the light valve array to facilitate viewing of the background scene 101 through the backlit transparent display 100, according to various embodiments.

In accordance with some embodiments of the principles described herein, a transparent display system is provided. The transparent display system is configured to emit modulated light as pixels of an image that is displayed on or by the transparent display. Further, the transparent display system is configured to enable a background scene to be visible through the transparent display system, according to various embodiments.

In some embodiments, the transparent display may be a two-dimensional (2D) transparent display system configured to emit modulated light having a relatively broad, but substantially non-directional viewing angle. That is, the 2D transparent display system may emit modulated light as pixels of the displayed image, e.g., as a '2D' image. Further, as a 2D image, the displayed image is configured to provide the same view of the displayed image to a viewer substantially anywhere within the broad viewing angle. According to various embodiments, the displayed image provided by the transparent display system may appear as being superimposed on or in the background scene.

In other embodiments, the transparent display system may be a transparent multiview display system in which the emitted modulated light comprises emitted modulated directional light beams that are be preferentially directed toward a plurality of viewing directions of the transparent multiview display system. With respect to the transparent multiview display system embodiments, the displayed image may be a three-dimensional (3D) or multiview image comprising directional pixels having directions corresponding to directions of the modulated directional light beams. In particular, different ones of the emitted modulated directional light beams may correspond to individual directional pixels of different 'views' associated with the multiview image. The different views may provide a 'glasses free' (e.g., autostereoscopic) viewing experience of a representation of information in the multiview image being displayed by the transparent multiview display system, for example. Further and as with the 2D image, the multiview image provided by the transparent multiview display system may appear as being superimposed on or in the background scene, according to various embodiments.

Figure 9:
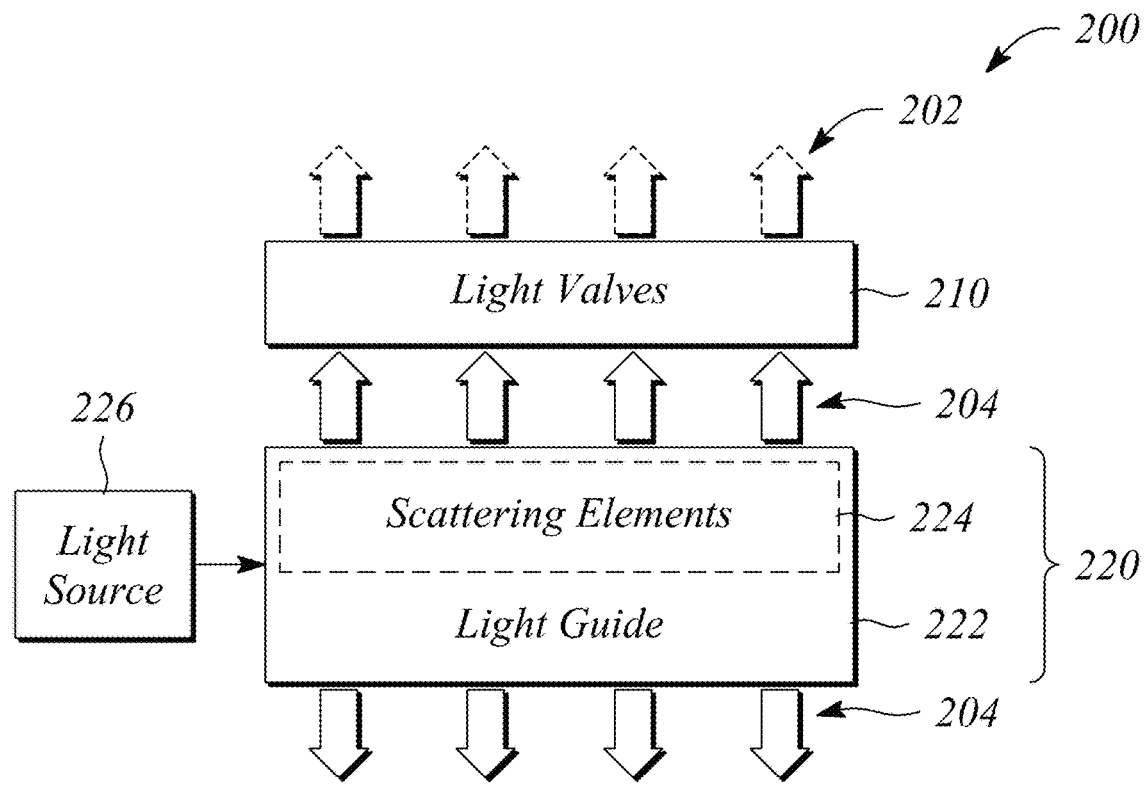
FIG. 9 illustrates a block diagram of a transparent display in an example, according to an embodiment consistent with the principles described herein.

FIG. 9 illustrates a block diagram of a transparent display system 200 in an example, according to an embodiment consistent with the principles described herein. According to various embodiments, the transparent display system 200 is configured to display an image that appears to a viewer or user of the transparent display system 200 to be superimposed on a background scene 201 (i.e., a scene that is behind or viewed through the transparent display system 200). In particular, the transparent display system 200 is configured to provide a displayed image as superimposed on the background scene 201 visible through the transparent display system 200.

In various embodiments as noted above, the displayed image may be a 2D image or a multiview image. In particular, modulated emitted light 202 provided by the transparent display system 200 corresponds to pixels of the displayed image (i.e., one or both of 2D pixels and multi-view/3D pixels). Further, in some embodiments, the modulated emitted light 202 from the transparent display system 200 may be diffuse or have a relatively wide view angle, as when 2D image is displayed. In other embodiments, the modulated emitted light 202 may be modulated directional light beams and thus may correspond to directional pixels of the different views of a displayed multiview image. The modulated emitted light 202 is illustrated as arrows emanating the transparent display system 200 in FIG. 9. Dashed lines are used for the arrows of the modulated emitted light 202 to emphasize the modulation thereof, by way of example and not limitation.

The transparent display system 200 illustrated in FIG. 9 comprises an array of light valves 210. The array of light valves 210 is configured to modulate emitted light 204 to provide the modulated emitted light 202 representing the displayed image (i.e., pixels of the displayed image). In some embodiments, the array of light valves 210 may be substantially similar to the array of light valves 130 of the above-described backlit transparent display 100.

The transparent display system 200 illustrated in FIG. 9 further comprises a transparent backlight 220. According to various embodiments, the transparent backlight 220 comprises a light guide 222 having a plurality of scattering elements 224. The transparent backlight 220 further comprises a light source 226 coupled to an edge of the light guide 222, in various embodiments. The light source 226 is configured to provide light to be guided within the light guide 222 as guided light. The plurality of scattering elements 224 is configured to scatter out a portion of the guided light as the emitted light 204. The emitted light 204 may have a direction toward one or both of the light valve array and the background scene 201, according to various embodiments. Further, a transparency of a combination of the transparent backlight 220 and the array of light valves 210 is configured to enable the background scene 201 to be visible through the transparent display system 200, according to various embodiments.

In some embodiments, the light guide 222 and plurality of scattering element 224 of the transparent backlight 220 may be substantially similar respectively to the light guide 110 and plurality of scattering element 120 of the above-described backlit transparent display 100. For example, the plurality of scattering elements 224 may comprise one or more of a polarization-preserving scattering element, an angle-preserving scattering element, and a unidirectional scattering element. Further, in various embodiments, a scattering element 224 of the scatter element plurality may comprise any of the scattering elements 120 illustrated in and describe with respect to FIGS. 4A-8. That is, a scattering element 224 of the scattering element plurality may comprise one or more of a diffraction grating, a micro-reflective scattering element and a micro-refractive scattering element optically connected to the light guide 222 and configured to scatter out the portion of the guided light. Further, a size of the scattering element 224 may be less than a size of a light valve 210 of the light valve array, in some embodiments.

In other embodiments, the plurality of scattering elements 224 may comprise a plurality of multibeam elements. According to these embodiments, a multibeam element of the plurality of multibeam elements may be configured to scatter out a portion of the guided light as a plurality of directional light beams having different principal angular directions. In particular, the different principal angular directions of various directional light beams of the directional light beam plurality may correspond to respective different view directions of a multiview image. As such, the transparent display system 200 may be a multiview transparent display system and the displayed image may be or represent a multiview image. In some embodiments, a size of the multibeam element is between about fifty percent and about two hundred percent of a size of a light valve 210 of the array of light valves 210.

In some embodiments, a density of the scattering elements 224 in the scattering element plurality may be configured to vary as a function of distance from the edge of the light guide 222 to which the light source 226 is coupled. The density may be varied as a function of distance to compensate for a variation in an intensity of the guided light within the light guide 222, for example.

Further, according to some embodiments, the light source 226 of the transparent backlight 220 may be substantially similar to the light source 140 of the backlit transparent display 100, as described above. For example, the light source 226 may be configured to provide the guided light one or both of having a non-zero propagation angle and being collimated according to a predetermined collimation factor. The light source 226 may comprise a collimator configured to provide the guided light as collimated guided light having a predetermined collimation factor, for example.

In some embodiments, the array of light valves 210 may be adjacent to a first surface of the light guide 222 opposite to a second surface adjacent to the background scene 201. The scattering elements 224 may be further configured to scatter another portion of the guided light out of the light guide through the second surface. The other portion of the guide light that is scattered out by the scattering elements 224 may be used to illuminate (or serve as an illumination source for) the background scene 201, for example. FIG. 9 illustrates emitted light 204 provide by the scattering elements 224 of the transparent backlight 220 from the other portion of the guided light as arrows directed toward the background scene 201. Although not explicitly illustrated in FIG. 9, in these embodiments, the light valve array may be configured to modulate the emitted light 204 reflected by the background scene 201.

In some embodiments, the light source 226 may be configured to provide the light having a predetermined polarization. For example, the light source 226 may comprise a polarizer or polarized optical emitters. In these embodiments, the plurality of scattering elements 224 may be configured to provide polarization-preserving scattering and the emitted light 204 may have a polarization configured to match an input polarization of the array of light valves 210, for example.

Figure 10:
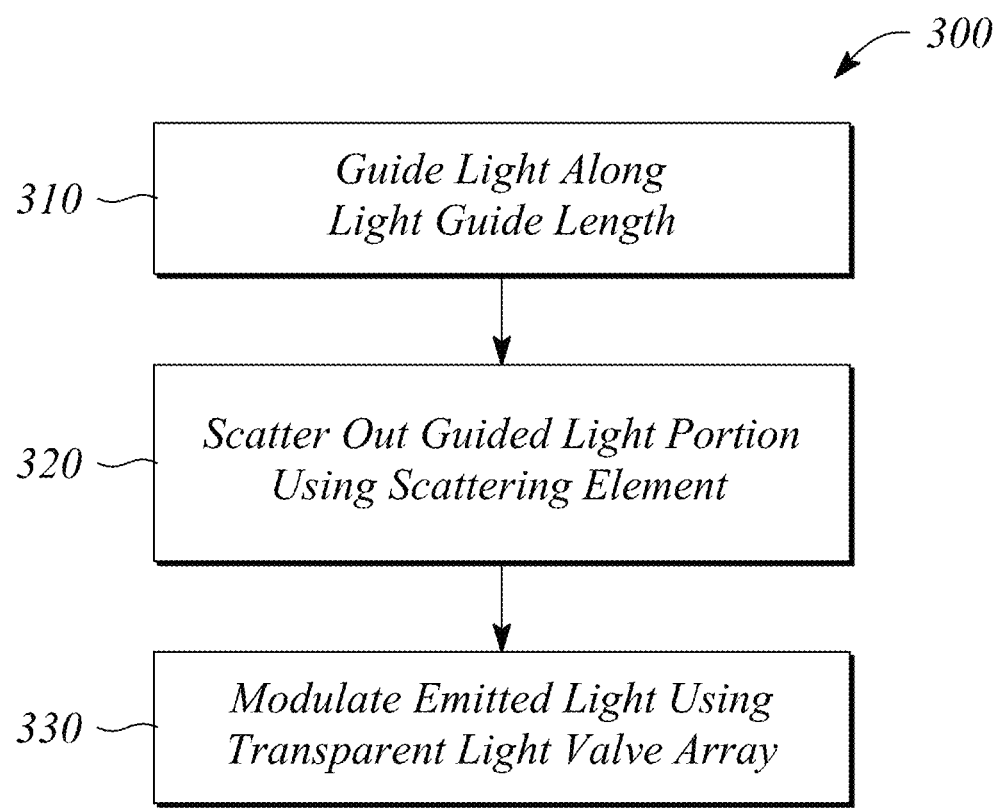
FIG. 10 illustrates a flow chart of a method of transparent display operation in an example, according to an embodiment consistent with the principles described herein.

In accordance with other embodiments of the principles described herein, a method of transparent display operation is provided. FIG. 10 illustrates a flow chart of a method 300 of transparent display operation in an example, according to an embodiment consistent with the principles described herein. As illustrated in FIG. 10, the method 300 of transparent display operation comprises guiding 310 light along a length of a light guide as guided light. In some embodiments, the light may be guided 310 at a non-zero propagation angle. Further, the guided light may be collimated according to a predetermined collimation factor. Further still, the guided light may be polarized or have a predetermined polarization. According to some embodiments, the light guide may be substantially similar to the light guide 110 described above with respect to the backlit transparent display 100.

As illustrated in FIG. 10, the method 300 of transparent display operation further comprises scattering 320 a portion of the guided light out of the light guide as emitted light using a plurality of scattering elements. In some embodiments, the plurality of scattering elements is substantially similar to the plurality of scattering elements 120 described above with respect to the backlit transparent display 100.

The method 300 of transparent display operation illustrated in FIG. 10 further comprises modulating 330 the emitted light using a transparent array of light valves. The transparent array of light valves is configured to modulate the emitted light as a displayed image. According to various embodiments, a combination of the light guide, the plurality of scattering elements and the transparent light valve array of the transparent display enable a background scene to be visible through the transparent display. Further, the displayed image may be superimposed on the visible background scene by the transparent display operation, according to various embodiments. In some embodiments, the transparent array of light valves may be substantially similar to the array of light valves 130 of the above-described backlit transparent display 100.

In some embodiments, a size of a scattering element of the scattering element plurality used in scattering 320 is less than a size of a light valve of the light valve array. In some embodiments, the plurality of scattering elements comprises one or more of a diffraction grating, a micro-reflective scattering element and a micro-refractive scattering element optically connected to the light guide. In some embodiments, the emitted light is directed toward one or both of the transparent light valve array and the background scene, the emitted light directed toward the background scene being configured to provide illumination to the background scene.

In some embodiments (not illustrated), the method 300 of transparent display operation further comprises providing light to the light guide using a light source. The provided light may be the guided light that one or both of has a non-zero propagation angle within the light guide and is collimated within the light guide according to a collimation factor to provide a predetermined angular spread of the guided light within the light guide. In some embodiments, the light source may be substantially similar to the light source 140 of the backlit transparent display 100, described above.

Thus, there have been described examples and embodiments of a backlit transparent display, a transparent display system, and a method of backlit transparent display operation that enable a background scene to be visible through the transparent display and which may superimpose a displayed image on the visible background scene. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A backlit transparent display comprising:
a light guide configured to guide light along a length of the light guide as guided light;
a plurality of scattering elements spaced apart from one another along and across the light guide, the plurality of scattering elements being configured to scatter out a portion of the guided light as emitted light; and
an array of light valves configured to modulate the emitted light scattered out toward the light valve array as a displayed image,
wherein emitted light scattered out of the light guide in a direction away from the light valve array and toward a background scene is configured to illuminate the background scene, a transparency of the backlit transparent display being configured to enable the background scene to be visible through the backlit transparent display, and
wherein the plurality of scattering elements comprises a plurality of multibeam elements, a multibeam element of the plurality of multibeam elements being configured to scatter out a portion of the guided light as a plurality of directional light beams having different principal angular directions corresponding to respective different view directions of a multiview image, the backlit transparent display being a transparent multiview display and the displayed image being a multiview image.

2. The backlit transparent display of claim 1, wherein the plurality of scattering elements is configured to provide the emitted light as diffuse light, the displayed image being superimposed on a view of the background scene through the backlit transparent display.

3. The backlit transparent display of claim 1, wherein the scattering element of the scattering element plurality is located one of at a first surface and at a second surface of the light guide, the scattering element being configured to scatter out the guided light portion through the first surface adjacent to the light valve array.

4. The backlit transparent display of claim 1, wherein a scattering element of the scattering element plurality comprises a diffraction grating configured to diffractively scatter out the portion of the guided light as the emitted light.

5. The backlit transparent display of claim 1, wherein the plurality of scattering elements comprises one or both of a micro-reflective scattering element and a micro-refractive scattering element, the micro-reflective scattering element being configured to reflectively scatter out a portion of the guided light, the micro-refractive scattering element being configured to refractively scatter out a portion of the guided light.

6. The backlit transparent display of claim 1, wherein a scattering element of the scattering element plurality comprises a unidirectional scattering element.

7. The backlit transparent display of claim 6, wherein the unidirectional scattering element comprises an inverse prismatic scattering element.

8. A transparent display system comprising the backlit transparent display of claim 1, the transparent display system further comprising a light source optically coupled to an input edge of the light guide, the light source being configured to provide the guided light one or both of having a non-zero propagation angle and being collimated according to a predetermined collimation factor.

9. A transparent display system comprising:
an array of light valves configured to modulate emitted light to provide a displayed image; and
a transparent backlight comprising a light guide having a plurality of scattering elements and a light source coupled to an edge of the light guide, the light source being configured to provide light to be guided within the light guide as guided light and the plurality of scattering elements being configured to scatter out a portion of the guided light as the emitted light having a direction both toward the light valve array and away from the light valve array and toward a background scene, wherein the transparent display system is configured to provide the displayed image as superimposed on the background scene visible through the transparent display system, the emitted light directed toward the background scene serving as an illumination source of the background scene, and wherein the plurality of scattering elements comprises a plurality of multibeam elements, a multibeam element of the plurality of multibeam elements being configured to scatter out a portion of the guided light as a plurality of directional light beams having different principal angular directions corresponding to respective different view directions of a multiview image, the backlit transparent display being a transparent multiview display and the displayed image being a multiview image.

10. The transparent display system of claim 9, wherein a scattering element of the scattering element plurality comprises one or more of a diffraction grating, a micro-reflective scattering element and a micro-refractive scattering element optically connected to the light guide to scatter out the portion of the guided light.

11. The transparent display system of claim 9, wherein a density of scattering elements in the scattering element plurality is configured to vary as a function of distance from the edge of the light guide to which the light source is coupled, the density being varied as a function of distance to compensate for a variation in an intensity of the guided light within the light guide.

12. The transparent display system of claim 9, wherein a size of the scattering element is less than a size of a light valve of the light valve array, the displayed image representing two-dimensional (2D) content and the transparent display system being a transparent 2D display system.

13. The transparent display system of claim 9, wherein the plurality of scattering elements comprises one or more of a polarization-preserving scattering element, an angle-preserving scattering element, and a unidirectional scattering element.

14. A method of transparent display operation, the method comprising:

guiding light along a length of a light guide as guided light;

scattering a portion of the guided light out of the light guide as emitted light using a plurality of scattering elements; and modulating the emitted light using an array of light valves configured to modulate the emitted light as a displayed image, wherein a combination of the light guide, the plurality of scattering elements, and the light valve array of the transparent display enables a background scene to be visible through the transparent display, the displayed image being superimposed on the visible background scene, and wherein the emitted light is directed toward both of the light valve array and the background scene, the emitted light directed toward the background scene illuminating the background scene, and wherein the plurality of scattering elements comprises a plurality of multibeam elements, a multibeam element of the plurality of multibeam elements being configured to scatter out a portion of the guided light as a plurality of directional light beams having different principal angular directions corresponding to respective different view directions of a multiview image, the backlit transparent display being a transparent multiview display and the displayed image being a multiview image.

15. The method of transparent display operation of claim 14, wherein a size of a scattering element of the scattering element plurality is less than a size of a light valve of the light valve array, the displayed image representing two-dimensional (2D) content and the transparent display being a 2D transparent display.

16. The method of transparent display operation of claim 14, wherein a size of a scattering element of the scattering element plurality is between about fifty percent and about two hundred percent of a size of a light valve of the array of light valves.

17. The method of transparent display operation of claim 14, wherein the plurality of scattering elements comprises one or more of a diffraction grating, a micro-reflective scattering element and a micro-refractive scattering element optically connected to the light guide.

* * * * *